(12) United States Patent
Oda et al.

(10) Patent No.: US 9,162,684 B2
(45) Date of Patent: Oct. 20, 2015

(54) ELECTRONIC CONTROL UNIT FOR VEHICLE

(71) Applicant: DENSO CORPORATION, Kariya, Aichi-pref. (JP)

(72) Inventors: Shinichiro Oda, Gamagori (JP); Hiroyuki Enomoto, Kariya (JP); Takafumi Nishiseko, Kariya (JP)

(73) Assignee: DENSO CORPORATION, Kariya (JP)

( * ) Notice: Subject to any disclaimer, the term of this patent is extended or adjusted under 35 U.S.C. 154(b) by 267 days.

(21) Appl. No.: 13/644,511

(22) Filed: Oct. 4, 2012

(65) Prior Publication Data

US 2013/0090804 A1 Apr. 11, 2013

(30) Foreign Application Priority Data

Oct. 5, 2011 (JP) ................. 2011-221120

(51) Int. Cl.
| | |
|---|---|
| G01M 17/00 | (2006.01) |
| G06F 7/00 | (2006.01) |
| G06F 19/00 | (2011.01) |
| B60W 50/04 | (2006.01) |
| G07C 5/08 | (2006.01) |

(52) U.S. Cl.
CPC ............. *B60W 50/04* (2013.01); *G07C 5/0841* (2013.01); *B60G 2400/33* (2013.01); *B60G 2400/821* (2013.01); *B60G 2400/824* (2013.01); *B60W 2050/046* (2013.01); *B60W 2510/0604* (2013.01); *B60W 2550/14* (2013.01); *B60W 2550/141* (2013.01); *B60W 2550/142* (2013.01); *B60W 2550/402* (2013.01)

(58) Field of Classification Search
CPC ................................ G08G 1/123; G01S 19/42

USPC ............ 701/32.3, 33.4, 51, 94; 340/435, 905
See application file for complete search history.

(56) References Cited

U.S. PATENT DOCUMENTS

| 5,754,965 A | 5/1998 | Hagenbuch | |
|---|---|---|---|
| 2004/0236474 A1* | 11/2004 | Chowdhary et al. | ............... 701/1 |
| 2007/0109106 A1* | 5/2007 | Maeda et al. | ............... 340/426.1 |
| 2009/0066539 A1* | 3/2009 | Uemura et al. | ............... 340/905 |

(Continued)

FOREIGN PATENT DOCUMENTS

| JP | 2002-92794 | 3/2002 |
|---|---|---|
| JP | 2007-163472 | 6/2007 |

(Continued)

OTHER PUBLICATIONS

Office Action (2 pages) dated Jul. 30, 2013, issued in corresponding Japanese Application No. 2011-221120 and English translation (3 pages).

*Primary Examiner* — Tuan C. To
*Assistant Examiner* — Isaac Smith
(74) *Attorney, Agent, or Firm* — Nixon & Vanderhye PC

(57) ABSTRACT

An electronic control unit includes a threshold acquiring element, a behavior determining element and a storing element. The threshold acquiring element acquires a threshold for defining a determination condition. The threshold is set to correspond to a road condition on which a vehicle travels. The behavior determining element determines whether a vehicle behavior satisfies the determination condition defined by the threshold. The storing element stores predetermined operation data of the vehicle when the behavior determining element determines that the vehicle behavior satisfies the determination condition.

16 Claims, 12 Drawing Sheets

(56) References Cited

U.S. PATENT DOCUMENTS

2009/0318121 A1* 12/2009 Marumoto ............... 455/414.1
2010/0208076 A1*  8/2010 Kinoshita ................. 348/148
2010/0256858 A1* 10/2010 Yago et al. ................. 701/31
2011/0071755 A1*  3/2011 Ishigami et al. .......... 701/208
2011/0196644 A1*  8/2011 Davidson et al. ......... 702/142

FOREIGN PATENT DOCUMENTS

| JP | 2008-217703 | 9/2008 |
| JP | 2009-104544 | 5/2009 |
| JP | 2010-66895  | 3/2010 |
| JP | 2010-79665  | 4/2010 |

* cited by examiner

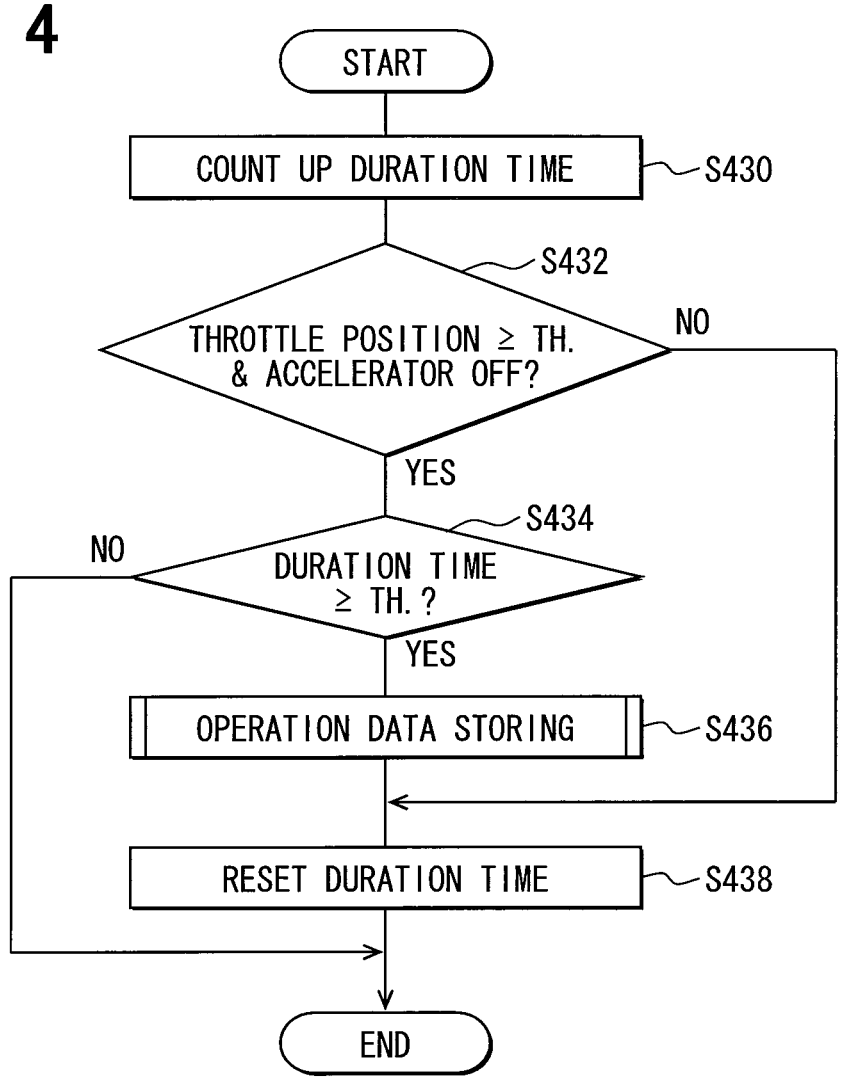

ELECTRONIC CONTROL UNIT FOR VEHICLE

CROSS REFERENCE TO RELATED APPLICATION

This application is based on Japanese Patent Application No. 2011-221120 filed on Oct. 5, 2011, the disclosure of which is incorporated herein by reference.

TECHNICAL FIELD

The present disclosure relates to an electronic control unit that stores predetermined operation data of a vehicle when a vehicle behavior satisfying a determination condition occurs.

BACKGROUND

Conventionally, it has been known to diagnose and analyze a vehicle behavior based on detection signals outputted from various sensors mounted on a vehicle. Such a technique is, for example, described in U.S. Pat. No. 5,754,965. Also, it has been known to store data outputted from various sensors before and after a vehicle receives an impact such as an impact of a collision as vehicle traveling data.

Further, it has been known, when a malfunction occurs in a sensor or an actuator, to store a diagnosis code according to the malfunction, and sensor outputs and control data according to a time axis as the operation data (freeze-frame data).

In a technique described above, the diagnosis code and the freeze-frame data are stored when the sensor or the actuator has a malfunction. For example, when a vehicle behavior that does not correspond to a driver's operation while the sensor and the actuator are in normal condition, the operation data at that time is not stored. Therefore, even if the driver feels uncomfortable due to the vehicle behavior that does not correspond to the driver's operation, the cause of the vehicle behavior is not analyzed based on the operation data of the vehicle.

For example, it is considered to set a determination condition to detect the vehicle behavior that does not correspond to the driver's operation, and to store the operation data when the vehicle behavior satisfies the determination condition. In such a case, it is possible to analyze the cause of the vehicle behavior that does not correspond to the driver's operation based on the operation data stored.

However, the cause of the uncomfortable feeling of the driver will be different depending on a road condition where the vehicle is or travels, such as whether the road is straight or curved, and whether the vehicle is on a road or in a parking. Therefore, if a threshold to define the determination condition is fixed, the following situation will occur.

For example, even if the vehicle has a behavior that causes uncomfortable feeling to the driver, when the behavior does not satisfy the determination condition, the behavior will not be stored as the operation data. Also, even if the vehicle has a behavior that does not cause uncomfortable feeling to the driver, when the behavior satisfies the determination condition, the behavior will be stored as the operation data. As a result, when the amount of storage of the operation data increases, the operation data regarding the vehicle behavior that causes the uncomfortable feeling to the driver will be overwritten due to the limitation of memory capacity.

SUMMARY

It is an object of the present disclosure to provide an electronic control unit that appropriately stores operation data according to a condition of a road on which the vehicle travels.

According to an aspect of the present disclosure, an electronic control unit for a vehicle includes a threshold acquiring element, a behavior determining element, and a storing element. The threshold acquiring element acquires a threshold defining a determination condition. The threshold is set to correspond to a road condition on which the vehicle travels. The behavior determining element determines whether a vehicle behavior satisfies the determination condition. Further, the storing element stores operation data of the vehicle in a storage unit when the behavior determining element determines that the vehicle behavior satisfies the determination condition.

In the above structure, a threshold suitable for the road condition is acquired. Therefore, it is less likely that the vehicle behavior will excessively satisfy or not satisfy the determination condition according to the road condition. Further, the operation data is stored when the vehicle behavior satisfies the determination condition that is defined by the threshold according to the road condition, suitable operation data is stored according to the road condition. Therefore, a situation that the operation data is not stored as the vehicle behavior does not satisfy the determination condition, even if the vehicle behavior causes uncomfortable feeling to a driver, is reduced. Also, a situation that the operation data is stored as the vehicle behavior satisfies the determination condition even if the vehicle behavior does not cause uncomfortable feeling to the driver is reduced.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which:

FIG. 4 is a flowchart illustrating a trigger determination process according to the first embodiment;

DETAILED DESCRIPTION

Exemplary embodiments of the present disclosure will be described with reference to the drawings.

First Embodiment

Figure 1A:
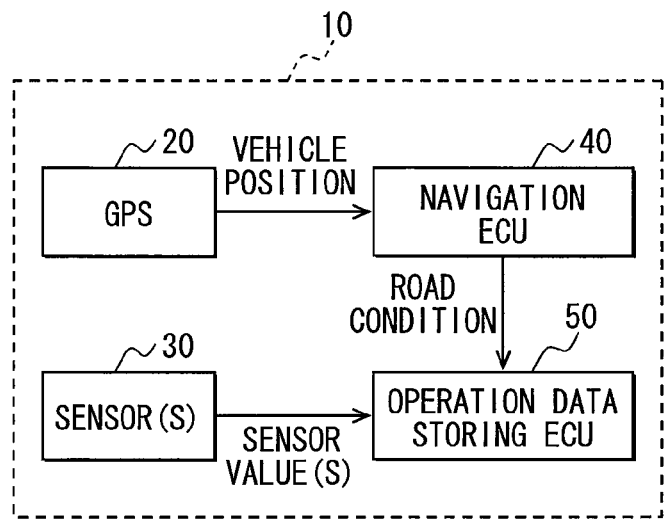
FIG. 1A is a block diagram of an operation data storing system including an operation data storing electronic control unit according to a first embodiment of the present disclosure.
Figure 1B:
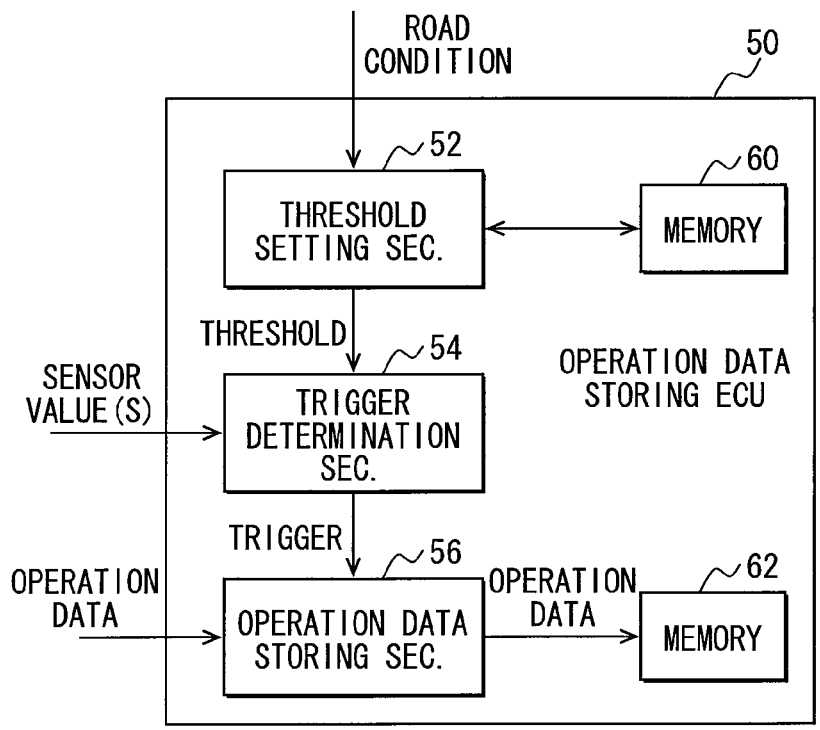
FIG. 1B is a block diagram of the operation data storing electronic control unit according to the first embodiment.

Referring to FIG. 1A, an operation data storing system 10 according to a first embodiment includes a global positioning system (GPS) 20, various sensors 30, a navigation electronic control unit (ECU) 40, and an operation data storing electronic control unit (ECU) 50. The operation data storing system 10 is mounted on a vehicle. Hereinafter, the vehicle on which the operation data storing system 10 is mounted is also referred to as the subject vehicle.

The navigation ECU 40 determines a current position of the subject vehicle on a map based on map data and position data, which is acquired from the GPS 20 and indicates a latitude and a longitude of the position of the subject vehicle. Also, the navigation ECU 40 controls a display unit disposed in a passenger compartment of the vehicle to display a map and the current position of the subject vehicle. Further, the navigation ECU 40 determines a road condition regarding a road on which the subject vehicle travels based on the position of the subject vehicle, a traveling direction of the subject vehicle and the like, and outputs the road condition to the operation data storing ECU 50.

For example, when the vehicle is traveling on a road, the road condition may include a shape of the road, such as curved and straight, a road grade, a road width, existence of a tunnel, occurrence of traffic jam or accident, existence of an obstacle such as a broken-down vehicle and the like. When the vehicle is traveling at a place other than a road, the road condition may include a traveling place such as a public parking. Further, the road condition may include weather conditions, such as freezing and fogging.

The operation data storing ECU 50 is typically provided by a microcomputer including a CPU, a ROM, a RAM, a standby RAM (SRAM), an EEPROM and the like. The SRAM is supplied with electric power from a battery even when an operation of the vehicle is stopped. Therefore, the SRAM can keep data stored therein.

The operation data storing ECU 50 serves as a threshold setting section 52, a trigger determination section 54, and an operation data storing section 56 as the CPU performs a control program stored in the ROM. The memory 60 is constructed of the RAM and the ROM. The memory 62 is constructed of the SRAM and the EEPROM.

The threshold setting section 52 calculates and sets a threshold defining a determination condition to be compared to a vehicle behavior, based on a reference threshold acquired from the ROM of the memory 60. The threshold is different corresponding to the road condition, which is for example acquired from the navigation ECU 40.

The trigger determination section 54 detects the vehicle behavior based on detection signals outputted from the sensors 30. The trigger determination section 54 further determines whether the vehicle behavior detected satisfies the determination condition defined by the threshold set by the threshold setting section 52. By determining whether the vehicle behavior satisfies the determination condition, the trigger determination section 54 determines whether a trigger for storing a predetermined operation data has occurred or not.

For example, the vehicle behavior includes an acceleration state of the vehicle that is detected from a throttle opening degree (throttle position) when an accelerator is off, a duration of the acceleration state and the like. If the acceleration state of the vehicle continues over a predetermined period of time when the accelerator is off, the driver feels uncomfortable.

The operation data storing section 56 stores the predetermined operation data in the memory 62 when the trigger determination section 54 determines that the vehicle behavior satisfies the determination condition. That is, the determination that the vehicle behavior satisfies the determination condition triggers storing of the predetermined operation data in the memory 62.

The predetermined operation data stored in the memory 62 provides information indicating the vehicle operation state when the vehicle behavior satisfies the determination condition. For example, an accelerator position, a throttle position, a shifting position of a transmission, a water temperature, an intake-air amount, an intake-air temperature, an engine rotation speed and the like are set beforehand as the operation data. For example, the driver may bring the vehicle to a dealer or the like when the driver feels uncomfortable. The operation data can be read from the memory 62 at the dealer or the like, and the cause of the vehicle behavior that satisfies the determination condition can be analyzed.

(Operation Data Storing Process)

Next, an operation data storing process will be described with reference to flowcharts shown in FIGS. 2 through 4. The operation data storing process is performed as the operation data storing ECU 50 serves as the threshold setting section 52, the trigger determination section 54 and the operation data storing section 56.

Figure 2:
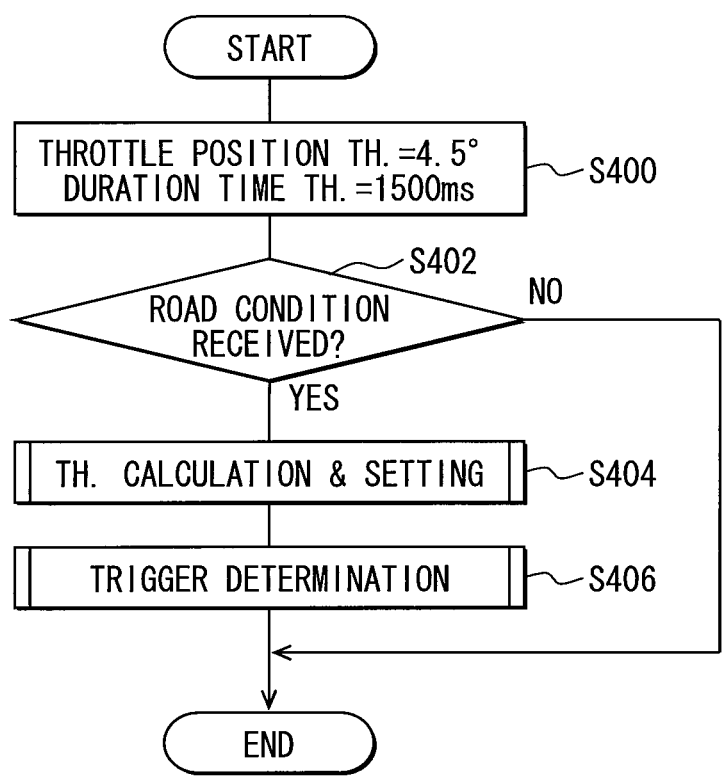
FIG. 2 is a flowchart illustrating a main process of an operation data storing process according to the first embodiment.
Figure 3:
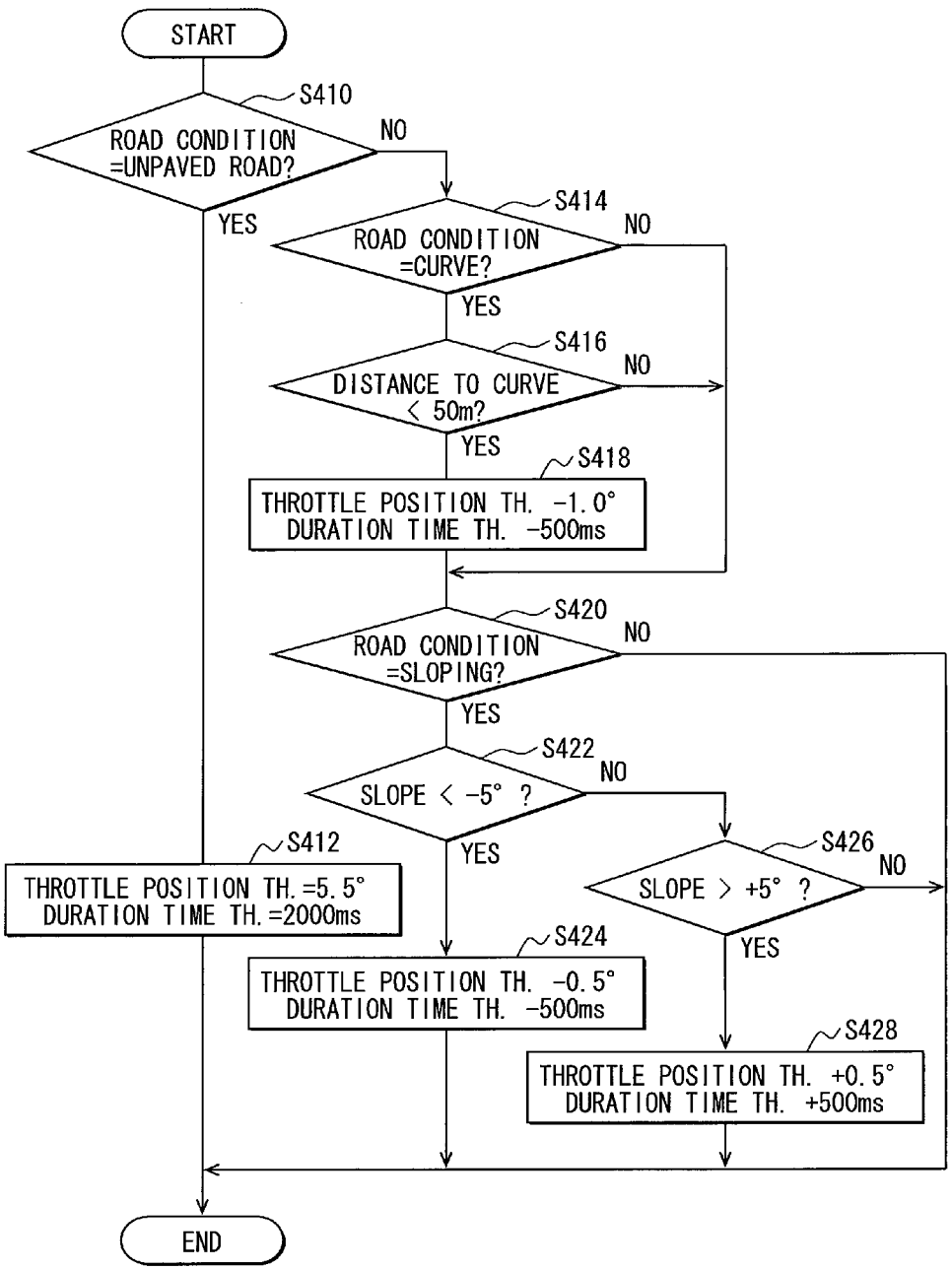
FIG. 3 is a flowchart illustrating a threshold calculation and setting process according to the first embodiment.

In the operation data storing process shown in FIGS. 2 through 4, the operation data is stored when the acceleration state of the vehicle as an example of the vehicle behavior relative to the driving operation satisfies the determination condition that has a different threshold depending on the road condition.

(Main Process)

FIG. 2 is a flowchart illustrating a main process of the operation data storing process. For example, the main process is performed every 100 milliseconds (ms).

At S400, the operation data storing ECU 50 acquires a throttle position threshold and a duration time threshold as the reference threshold of the determination condition from the ROM of the memory 62 for determining whether the vehicle behavior is an abnormal behavior that does not correspond to the driver's driving operation. For example, as the reference threshold, the throttle position threshold is 4.5°, and the duration time threshold is 1500 ms.

The duration time threshold is a threshold indicating a predetermined time for determining whether a vehicle behavior where a state of the throttle position detected from the throttle position sensor being equal to or greater than the throttle position threshold has endured over a predetermined period of time.

At S402, the operation data storing ECU 50 determines whether the road condition is received from the navigation ECU 40. The navigation ECU 40 transmits the road condition through an in-vehicle LAN or the like when the condition of the road on which the vehicle travels does not indicate a straight road, such as a curved road or a sloping road. Here, the curved condition includes an area before a curve and an area within the curve. When the road condition is not received, corresponding to "No" at S402, the operation data storing process is ended. Therefore, the operation data is not stored in the memory 62.

When the road condition is received, corresponding to "Yes" at S402, the operation data storing ECU 50 calculates and sets the threshold for defining the determination condition based on the road condition acquired from the navigation ECU 40 at S404. When the determination threshold is set at S404, the operation data storing ECU 50 determines whether the abnormal vehicle behavior that satisfies the determination condition defined by the threshold has occurred at S406. When the abnormal vehicle behavior has occurred, the operation data storing ECU 50 stores the predetermined operation data in the memory 62 at S406.

Next, a threshold calculation and setting process performed at S404 and a trigger determination process performed at S406 will be described in detail with reference to FIGS. 3 and 4.

(Threshold Calculation and Setting Process)

Referring to a flowchart shown in FIG. 3, at S410, the operation data storing ECU 50 determines whether the road condition acquired from the navigation ECU 40 indicates a rough road such as an unpaved road.

When the road is a rough road having projections and recesses such as an unpaved road, a detection value of the throttle position sensor is likely to vary. Therefore, there is a possibility that the acceleration state is detected with a value higher than an actual value.

In such a case, if the throttle position threshold and the duration time threshold set as the reference thresholds at S400 are directly used, the vehicle behavior is likely to be determined as the acceleration state when the accelerator is off. As a result, there is a possibility that the operation data is stored even through the driver does not feel uncomfortable in the acceleration state when the accelerator is off.

To avoid such a situation, therefore, when the road condition indicates the unpaved road, corresponding to "Yes" at S410, the operation data storing ECU 50 sets the throttle position threshold and the duration time threshold to values greater than the reference thresholds obtained at S412. For example, the throttle position threshold is changed from 4.5° to 5.5°, and the duration time threshold is changed from 1500 ms to 2000 ms. It is to be noted that the unpaved road is an example of the rough road, and the rough road may include a road under construction.

The throttle position threshold is increased from the reference threshold thereof and the duration time threshold is increased from the reference threshold thereof. Namely, the throttle position threshold and the duration time threshold are changed in such a manner that the acceleration state does not easily satisfy the determination condition in the determination of the acceleration state when the accelerator is off. In other words, when it is determined that the acceleration state of the vehicle is likely to satisfy the determination condition based on the road condition, that is, when it is determined that the acceleration state of the vehicle unnecessarily satisfies the determination condition based on the road condition, the threshold is set to define the determination condition to a higher condition to have the acceleration state satisfying the determination condition later than when the determination condition is not higher.

In this case, the acceleration state is restricted from satisfying the determination condition when the driver does not feel uncomfortable in the acceleration state when the accelerator is off. Therefore, it is less likely that the operation data will be stored due to the detection value of the throttle position sensor being affected. Accordingly, the operation data stored as a result of the vehicle behavior causing the uncomfortable feeling to the driver will not be overwritten due to the vehicle behavior that does not cause the uncomfortable feeling to the driver.

When the road condition does not indicate the unpaved road, corresponding to "No" at S410, the operation data storing ECU 50 determines whether the road condition indicates a curved road at S414. Here, when the vehicle is before the curve or when the vehicle is within the curve, the road condition is indicated as the curved road. For example, in a case where there is a curve ahead of the vehicle, the navigation ECU 40 transmits the road condition indicating the curve road when a distance between the vehicle and the curve is equal to or less than 50 meters (m). When the road condition does not indicate the curved road, corresponding to "No" at S414, the operation data storing ECU 50 proceeds to S420.

When the road condition indicates the curved road, corresponding to "Yes" at S414, the operation data storing ECU 50 determines whether a distance from a current position of the vehicle to the curve is less than 50 m at S416. When the vehicle is traveling within the curve, the distance to the curve is zero or a minus distance. Therefore, a determination result at S416 corresponds to "Yes". When the distance to the curve is equal to or greater than 50 m, corresponding to "No" at S416, the operation data storing ECU 50 proceeds to S420.

When the distance to the curve is less than 50 m, corresponding to "Yes" at S416, the operation data storing ECU 50 subtracts 1.0° from the throttle position threshold, and subtracts 500 ms from the duration time threshold at S418. Therefore, the throttle position threshold is set to 3.5°, and the duration time threshold is set to 1000 ms.

In the road condition where the distance to the curve is less than 50 m, it is assumed that a deceleration operation such as accelerator off, braking and shifting down is performed. In such a situation, the driver is likely to feel uncomfortable even in a low acceleration state.

Therefore, in the road condition where the deceleration operation such as the accelerator off is assumed to be performed, such as before the curve or within the curve, the throttle position threshold and the duration time threshold are changed to lower values by the subtraction. Namely, the throttle position threshold and the duration time threshold are changed in such a manner that the acceleration state easily satisfies the determination condition in the determination of the acceleration state when the accelerator is off. In other words, when it is determined that the deceleration operation is indicated based on the road condition, the threshold is set to define the determination condition as a lower condition to have the acceleration state of the vehicle satisfying the determination condition earlier than when the determination condition is not lowered.

Therefore, in the road condition where the driver is likely to feel uncomfortable, such as before the curve or within the curve, even in the low acceleration state, the vehicle behavior will readily satisfy the determination condition. Accordingly, the operation data is properly stored.

At S420, the operation data storing ECU 50 determines whether the road condition indicates a sloping road. When the road condition does not indicate the sloping road, corresponding to "No" at S420, the operation data storing ECU 50 ends the threshold calculation and setting process. When the road condition indicates the sloping road, corresponding to "Yes" at S420, the operation data storing ECU 50 proceeds to S422.

At S422, the operation data storing ECU 50 determines whether the sloping road is a downward slope with an angle of inclination lower than −5°. When the sloping road is the downward slope with the angle of inclination lower than −5°, corresponding to "Yes" at S422, the operation data storing ECU 50 subtracts 0.5° from the throttle position threshold and subtracts 500 ms from the duration time threshold at S424.

In this way, in the case where the road condition indicates a steeply downward slope with the angle of inclination lower than −5°, it is assumed that the deceleration operation is performed. Therefore, the subtraction of the throttle position threshold and the subtraction of the duration time threshold are performed, similar to a situation where the distance from the current position to the curve is less than 50 m. Namely, the throttle position threshold and the duration time threshold are changed in such a manner that the acceleration state of the vehicle easily satisfies the determination condition in the determination of the acceleration state when the accelerator is off. In other words, when it is determined that the deceleration operation is indicated based on the road condition, the threshold is set to define the determination condition as a lower condition to have the acceleration state of the vehicle satisfying the determination condition earlier than when the determination condition is not lowered.

Therefore, in the road condition where the driver is likely to feel uncomfortable in the acceleration state when the accelerator is off, such as in the steep downward slope with the angle of inclination lower than −5°, even in a low acceleration state, the vehicle behavior will readily satisfy the determination condition. Accordingly, the operation data is properly stored.

When the road condition indicates the sloping road with the angle of inclination equal to or greater than −5°, corresponding to "No" at S422, the operation data storing ECU 50 determines whether the sloping road is a rising slope with an angle of inclination greater than +5° at S426. When the angle of inclination is equal to or less than +5°, corresponding to "No" at S426, the operation data storing ECU 50 ends the threshold calculation and setting process.

When the angle of inclination is greater than +5°, corresponding to "Yes" at S426, the operation data storing ECU 50 adds 0.5° to the throttle position threshold, and adds 500 ms to the duration time threshold at S428.

When the road condition indicates a steep rising slope with the angle of inclination greater than +5° where the acceleration operation by pressing down on the accelerator is assumed to be performed, the driver is less likely to feel uncomfortable at the low acceleration even when the accelerator is off. In the road condition where the acceleration operation is assumed to be performed, such as in the rising slope with the angle of inclination greater than +5°, the throttle position threshold and the addition of the duration time threshold are increased. Namely, the throttle position threshold and the duration time threshold are changed in such a manner that the acceleration state does not easily satisfy the determination condition in the determination of the acceleration state when the accelerator is off. In other words, when it is determined that the acceleration operation is indicated based on the road condition, the threshold is set to define the determination condition as a higher condition to have the acceleration state satisfying the determination condition later than when the determination condition is not higher.

Therefore, in the road condition where the driver is less likely to feel uncomfortable, such as in the steep rising road with the angle of inclination over +5°, in the low acceleration state, the vehicle behavior will not readily satisfy the determination condition. Accordingly, the operation data is less likely to be stored.

As a result, the operation data stored as a result of the vehicle behavior causing the uncomfortable feeling to the driver will not be overwritten due to the vehicle behavior that does not cause the uncomfortable feeling to the driver.

In the threshold calculation and setting process of FIG. 3, if the throttle position threshold and the duration time threshold are not newly set, the throttle position threshold and the duration time threshold are retained to the reference thresholds set in the main process of FIG. 2.

(Trigger Determination Process)

In the trigger determination process shown in FIG. 4, at S430, the operation data storing ECU 50 counts up a duration time. At S432, the operation data storing ECU 50 determines whether the throttle position is equal to or greater than the throttle position threshold set in the main process of FIG. 2 or in the threshold calculation and setting process of FIG. 3, and determines whether the accelerator is off.

When the throttle position is equal to or greater than the throttle position threshold and the accelerator is off, corresponding to "Yes" at S432, the operation data storing ECU 50 proceeds to S434. When the throttle position is less than the throttle position threshold or the accelerator is on, corresponding to "No" at S432, the operation data storing ECU 50 proceeds to S438.

At S434, the operation data storing ECU 50 determines whether the duration time is equal to or greater than the duration time threshold set in the main process of FIG. 2 or in the threshold calculation and setting process of FIG. 3. When the duration time is equal to or greater than the duration time threshold, corresponding to "Yes" at S434, the operation data storing ECU 50 proceeds to S436. When the duration time is less than the duration time threshold, corresponding to "No" at S434, the operation data storing ECU 50 ends the trigger determination process.

When a state where the throttle position is equal to or greater than the throttle position threshold and the accelerator is off has continued for a time period equal to or greater than the duration time threshold, corresponding to "Yes" at S434, the operation data storing ECU 50 stores the operation data at that time in the memory 62. As described above, the memory 62 includes the SRAM and the EEPROM. Therefore, even when the operation of the vehicle is stopped, the operation data is held in the memory 62.

The memory 62, which stores the operation data, is configured as a ring buffer. The memory 62 stores a predetermined number of times of the operation data in which the vehicle behavior satisfies the determination condition. When the vehicle behavior satisfies the determination condition over the predetermined number of times, the oldest operation data is overwritten by the latest operation data.

The operation data storing ECU 50 resets the duration time at S438, and then ends the trigger determination process.

When an abnormal vehicle behavior, which does not correspond to the driver's operation, occurs and the driver feels uncomfortable, the vehicle will be brought to a dealer or the like. In such a case, the operation data stored in the memory 62 by the trigger determination process is read from the memory 62 using a diagnosis device to analyze the cause of the abnormal vehicle behavior.

In the first embodiment described above, the threshold for defining the determination condition such as the throttle position threshold and the duration time threshold is set in accordance with the road condition such as the unpaved road and the angle of inclination of the sloping road. Therefore, the threshold can be suitably determined in accordance with the road condition.

As compared with the case where the threshold for defining the determination condition is fixed, it is less likely that the vehicle behavior will excessively satisfy or not satisfy the determination condition due to the road condition.

Further, the operation data is stored when the vehicle behavior satisfies the determination condition that is defined by the threshold determined in accordance with the road condition. Therefore, when the vehicle behavior causing the uncomfortable feeling to the driver occurs, the operation data will be properly stored because of the threshold to define the determination condition being properly set. Further, when the vehicle behavior without causing the uncomfortable feeling to the driver occurs, the operation data will not stored because the threshold to define the determination condition being properly set The operation data storing ECU 50 acquires the road condition from the navigation ECU 40 of the subject vehicle. Namely, the condition of the road on which the subject vehicle travels can be acquired using the functions of the navigation ECU 40 mounted in the subject vehicle.

The operation data storing ECU 50 calculates and sets the throttle position threshold and the duration time threshold based on the road condition acquired from the navigation ECU 40. In this case, it is not necessary to acquire the throttle position threshold and the duration time threshold through communication with an external system or device. Further, it is less likely that the process for setting the thresholds will be disturbed due to a communication fault or low communication performance.

In the first embodiment, the navigation ECU 40 corresponds to a navigation device, and the operation data storing ECU 50 corresponds to an electronic control unit. Further, the memory 62 corresponds to a storage unit. Moreover, the threshold setting section 52 serves as a road condition acquiring section and a threshold setting section. The trigger determination section 54 serves as a behavior determination section, and the operation data storing section 56 serves as a storage section.

The process of S400 of FIG. 2 and S412, S418, S424 and S428 of FIG. 3 corresponds to a function provided by the threshold acquiring element. The process of S402 of FIG. 2 and the process of determining the road condition at S410, S414, S416, S420, S422 and S426 of FIG. 3 correspond to functions provided by the road condition acquiring element.

The process of S432 and S434 of FIG. 4 corresponds to a function provided by the behavior determining element. The process of S436 of FIG. 4 corresponds to a function provided by the storing element.

Second Embodiment

Figure 5A:
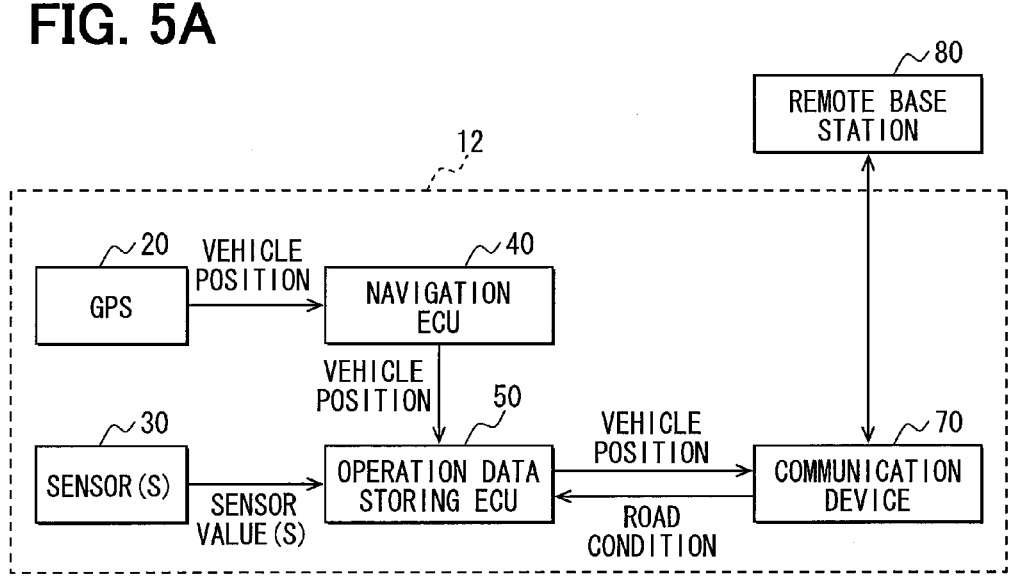
FIG. 5A is a block diagram of an operation data storing system including an operation data storing electronic control unit according to a second embodiment of the present disclosure.
Figure 5B:
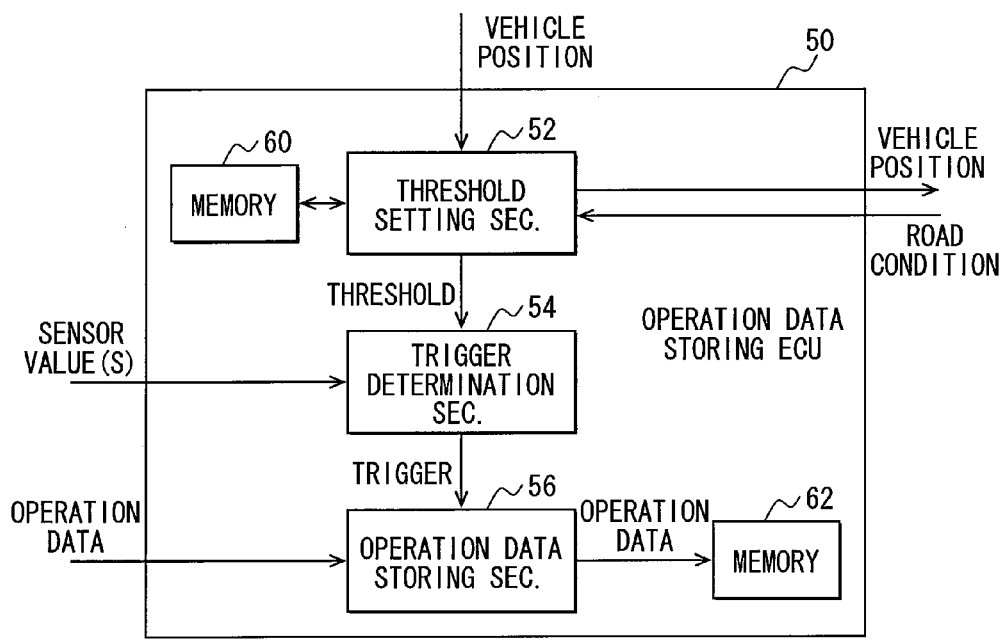
FIG. 5B is a block diagram of the operation data storing electronic control unit according to the second embodiment.

Referring to FIGS. 5A and 5B, an operation data storing system 12 according to a second embodiment is different from the operation data storing system 10 of the first embodiment because the operation data storing system 12 of the second embodiment includes a communication device 70 to perform communication with a remote base station 80.

The operation data storing ECU 50 transmits the position of the subject vehicle acquired from the navigation ECU 40 and a vehicle identification number (VIN) for identifying the subject vehicle to the remote base station 80 through the communication device 70. The operation data storing ECU 50 receives the road condition according to the position of the subject vehicle from the remote base station 80 through the communication device 70.

The remote base station 80 is provided with the latest map data base. The remote base station 80 determines the road condition of the vehicle position based on the map data base and the vehicle position transmitted from the vehicle at high accuracy, and transmits the road condition determined to the subject vehicle.

Next, an operation data storing process performed by the operation data storing ECU 50 and a road condition determining process performed by the remote base station 80 will be described with reference to FIGS. 6A and 6B.

(Operation Data Storing Process)

Figure 6A:
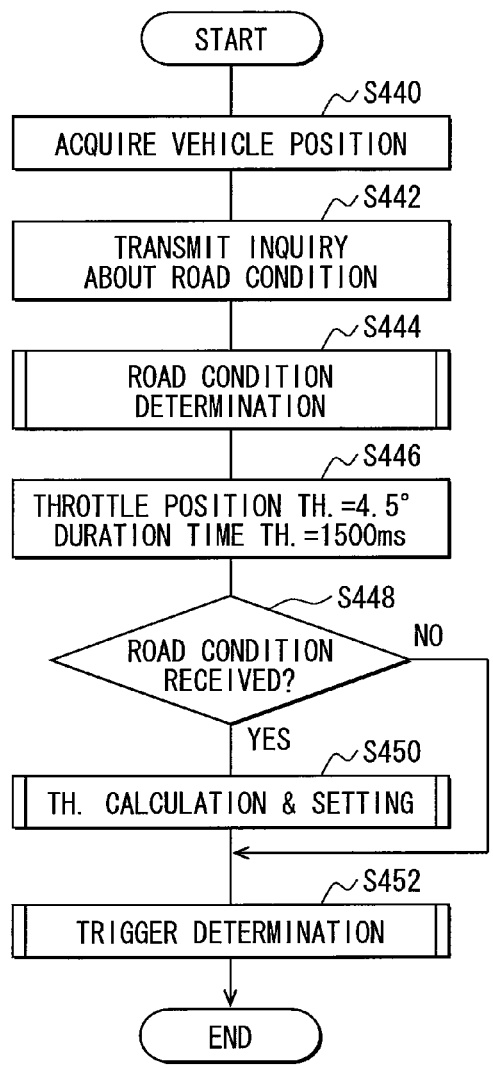
FIG. 6A is a flowchart illustrating a main process of an operation data storing process according to the second embodiment.

FIG. 6A is a flowchart illustrating a main process of the operation data storing process. For example, the main process is performed every 100 ms.

At S440, the operation data storing ECU 50 acquires the vehicle position from the navigation ECU 40. At S442, the operation data storing ECU 50 transmits the VIN and the vehicle position to the remote base station 80 through the communication device 70 to inquire the condition of the road where the subject vehicle is traveling.

S444 corresponds to the road condition determining process performed by the remote base station 80 in response to the inquiry of the road condition from the vehicle. The road condition setting process of S444 will be described later in detail.

At S446, the operation data storing ECU 50 reads and acquires the throttle position threshold and the duration time threshold of the vehicle behavior from the memory 60. For example, the throttle position threshold is 4.5°, and the duration time threshold is 1500 ms. At S448, the operation data storing ECU 50 determines whether the road condition is received from the remote base station 80.

When the road condition is not received from the remote base station 80 due to a communication fault or the like, corresponding to "No" at S448, the operation data storing ECU 50 proceeds to the S452 without performing a process of S450. In this case, the throttle position threshold and the duration time threshold are retained to the thresholds acquired at S446.

When the road condition is received from the remote base station 80, corresponding to "Yes" at S448, the operation data storing ECU 50 performs the threshold calculation and setting process at S450. Further, the operation data storing ECU 50 performs the trigger determination process at S452. The threshold calculation and setting process of S450 and the trigger determination process of S452 are substantially the same as the threshold calculation and setting process of FIG. 3 and the trigger determination process of FIG. 4.

(Road Condition Determining Process)

Figure 6B:
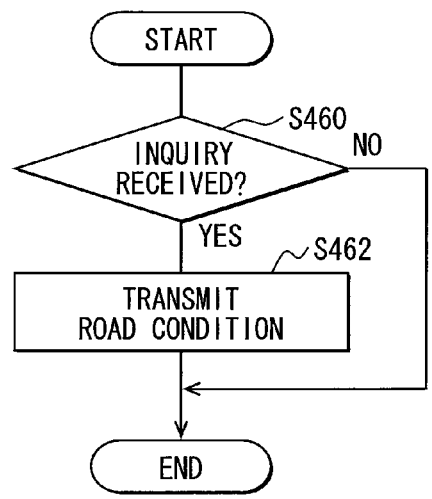
FIG. 6B is a flowchart illustrating a road condition determining process according to the second embodiment.

FIG. 6B is a flowchart illustrating the road condition determining process performed by the remote base station 80.

When the remote base station 80 receives the inquiry of the vehicle position from the vehicle, corresponding to "Yes" at S460, the remote base station 80 determines the road condition based on the vehicle position received from the vehicle and the map data base, and transmits the road condition to the vehicle at S462.

If the map data to which the navigation ECU 40 referrers is not new and an accuracy of the road condition determined by the navigation ECU 40 is low, it will be difficult to acquire a suitable road condition from the navigation ECU 40. In the second embodiment, even in such a situation, a suitable road condition can be determined in the remote base station 80 based on the vehicle position transmitted from the vehicle, and the operation data storing ECU 50 can acquire the road condition from the remote base station 80.

Even in a case where the navigation ECU 40 does not have a function of outputting the road condition, as the vehicle position is transmitted to the remote base station 80, a suitable road condition can be acquired from the remote base station 80.

In the second embodiment, the GPS 20 and the navigation ECU 40 correspond to a position detecting unit. Further, the process of acquiring the vehicle position from the navigation ECU 40 at S4400, transmitting the vehicle position to the remote base station 80 at S442 and receiving the road condition from the remote base station 80 at S448 corresponds to a function provided by the road condition acquiring element. The process of setting the threshold at S446 and S450 corresponds to a function provided by the threshold acquiring element. The process of comparing the vehicle behavior to the determination condition at S452 corresponds to a function provided by the behavior determining element. The process of storing the operation data in the memory 62 at S452 corresponds to a function provided by the storing element.

Third Embodiment

Figure 7A:
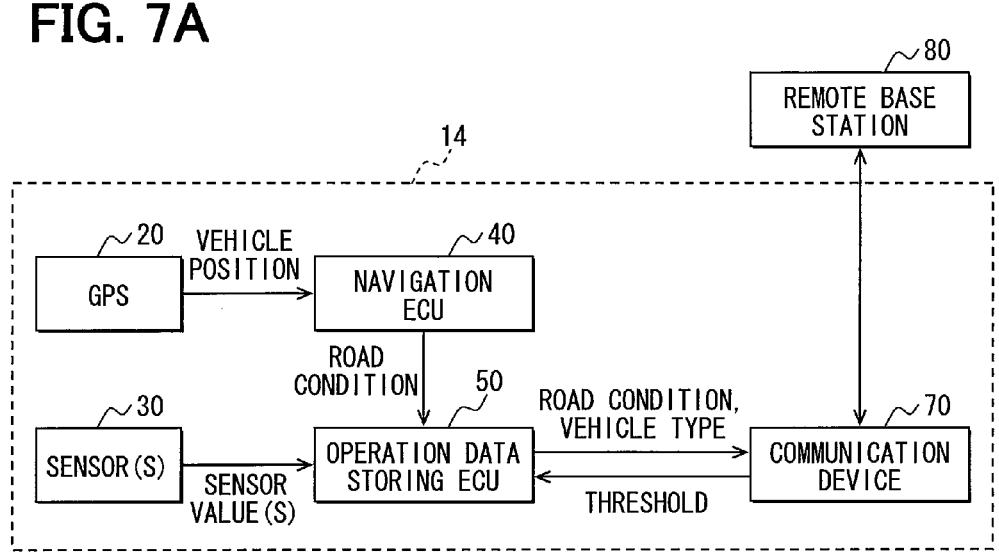
FIG. 7A is a block diagram illustrating an operation data storing system including an operation data storing electronic control unit according to a third embodiment of the present disclosure.
Figure 7B:
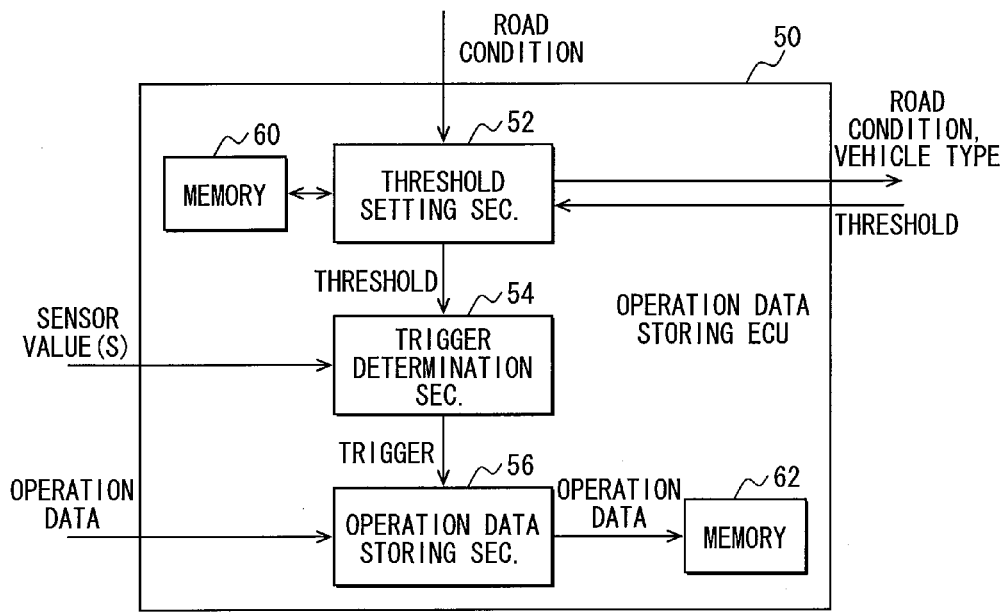
FIG. 7B is a block diagram illustrating the operation data storing electronic control unit according to the third embodiment.

Referring to FIGS. 7A and 7B, in an operation data storing system 14 according to a third embodiment, the operation data storing ECU 50 acquires the road condition from the navigation ECU 40, and transmits the road condition acquired from the navigation ECU 40 to the remote base station 80 through the communication device 70 together with the type of the vehicle and the VIN. Further, the operation data storing ECU 50 receives the threshold of the determination condition determined according to the road condition and the type of vehicle from the remote base station 80 through the communication device 70.

Next, an operation data storing process performed by the operation data storing ECU 50 and a threshold setting process performed by the remote base station 80 will be described with reference to FIGS. 8A and 8B.

(Operation Data Storing Process)

Figure 8A:
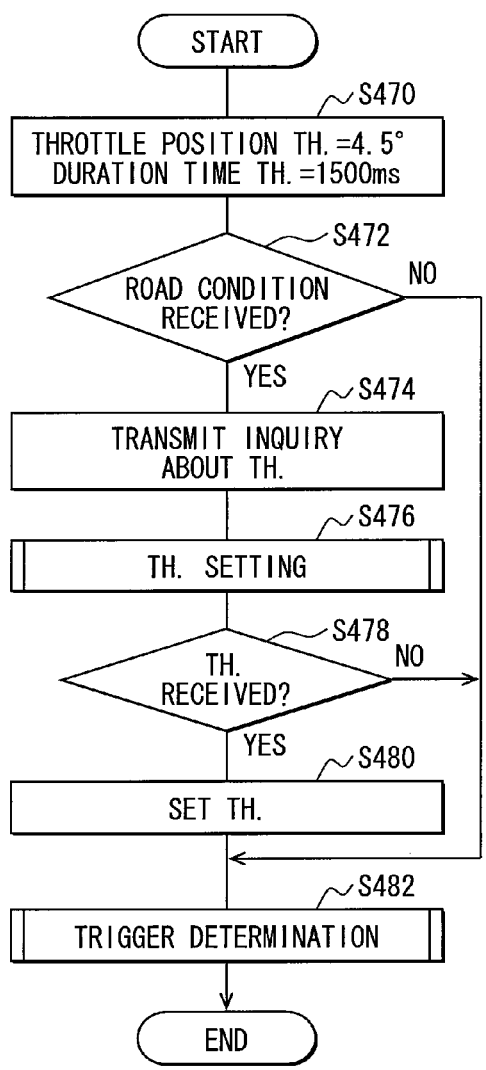
FIG. 8A is a flowchart illustrating a main process of an operation information storing process according to the third embodiment.

FIG. 8A is a flowchart illustrating a main process of the operation data storing process. For example, the main process of FIG. 8A is performed every 100 ms.

At S470, the operation data storing ECU 50 reads and acquires the throttle position threshold and the duration time threshold of the vehicle behavior from the memory 60. For example, the throttle position threshold is 4.5°, and the duration time threshold is 1500 ms. At S472, the operation data storing ECU 50 determines whether the road condition is received from the navigation ECU 40.

As described in the first embodiment, the navigation ECU 40 transmits the road condition through the in-vehicle LAN or the like when the condition of the road on which the vehicle travels does not continue as the straight road, such as a curve or a sloping. When the road condition is not received from the navigation ECU 40, corresponding to "No" at S472, the operation data storing ECU 50 proceeds to S482.

When the road condition is received from the navigation ECU 40, corresponding to "Yes" at S472, the operation data storing ECU 50 transmits the road condition, the type of the vehicle and the VIN to the remote base station 80 through the communication device 70 to inquire the threshold of the determination condition corresponding to the road condition and the type of the vehicle at S474.

S476 corresponds to the threshold setting process performed by the remote base station 80 in response to the inquiry of the threshold from the vehicle. The process of S476 will be described later in detail.

At S478, the operation data storing ECU 50 determines whether the threshold is received from the remote base station 80. When the threshold cannot been received from the remote base station 80 due to a communication fault or the like, corresponding to "No" at S478, the operation data storing ECU 50 proceeds to S482.

When the threshold is received from the remote base station 80, corresponding to "Yes" at S478, the operation data storing ECU 50 sets the threshold received from the remote base station 80 to the threshold of the determination condition at S480. At S482, the operation data storing ECU 50 performs the trigger determination process. The trigger determination process of S482 is substantially the same as the trigger determination process of FIG. 4 of the first embodiment.

(Threshold Setting Process)

Figure 8B:
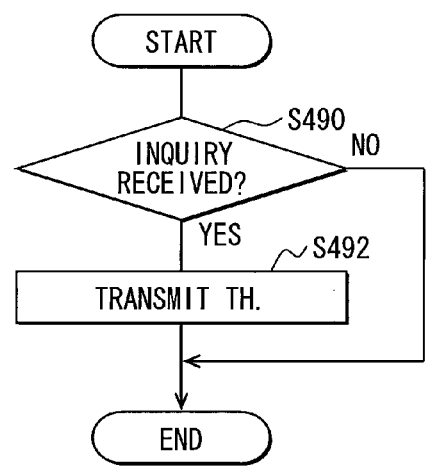
FIG. 8B is a flowchart illustrating a threshold setting process according to the third embodiment.

FIG. 8B is a flowchart illustrating the threshold setting process performed by the remote base station 80.

When the remote base station 80 receives the inquiry of the threshold from the vehicle that transmits the road condition and the type of the vehicle, corresponding to "Yes" at S490, the remote base station 80 determines a threshold corresponding to the road condition and the type of the vehicle using the threshold data base and based on the road condition and the type of the vehicle at S492. Further, the remote base station 80 transmits the threshold acquired to the corresponding vehicle.

In the third embodiment, the operation data storing ECU 50 transmits the road condition and the type of the vehicle to the remote base station 80, and acquires the threshold corresponding to the road condition and the type of the vehicle from the remote base station 80. Therefore, the operation data storing ECU 50 can acquire the threshold that is in a different range from the threshold acquired in the subject vehicle.

For example, in a case where the operation data of the vehicle behavior that satisfies a determination condition different from an ordinary determination condition is expected to be stored for a predetermined period of time from the time the corresponding type of vehicles are put on market, or in a case where the operation data when a specific abnormal behavior occurs is expected to be stored because unexpected abnormal behaviors occur and user's complaints are frequently made, the operation data storing ECU 50 can acquire the threshold determined according to these conditions from the remote base station 80.

In such a case, the operation data storing ECU 50 can acquire the threshold according to these conditions even when the vehicle is not brought to a dealer or the like.

In the third embodiment, the process at S470 of FIG. 8, the process of receiving the threshold from the remote base station 80 at S478, and the process at S480 correspond to functions provided by the threshold acquiring element. The process of receiving the road condition from the navigation ECU 40 at S472 corresponds to a function provided by the road condition acquiring element. The process of comparing the vehicle behavior to the determination condition at S482 corresponds to a function provided by the behavior determining element. The process of storing the operation data in the memory 62 at S482 corresponds to a function provided by the storing element.

Fourth Embodiment

Figure 9A:
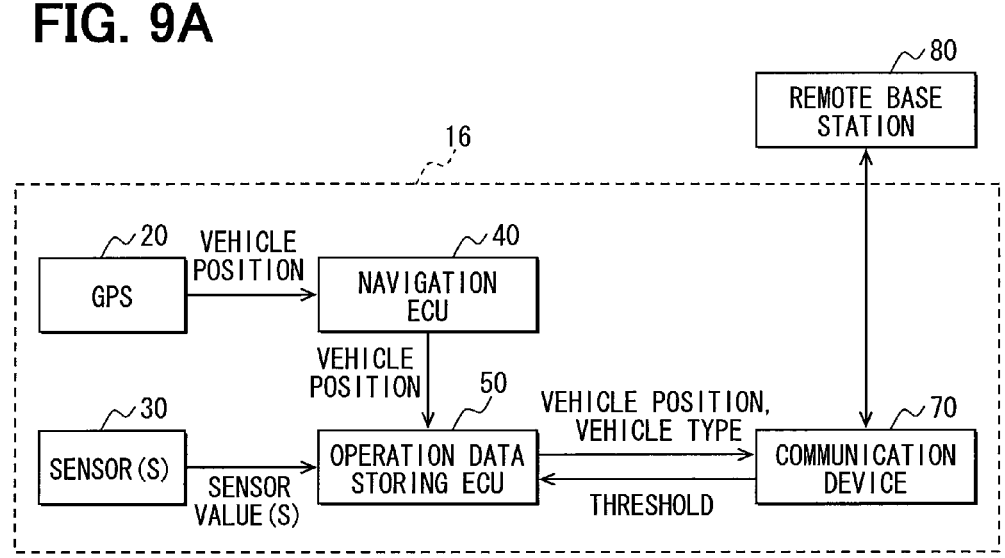
FIG. 9A is a block diagram illustrating an operation data storing system including an operation data storing electronic control unit according to a fourth embodiment of the present disclosure.
Figure 9B:
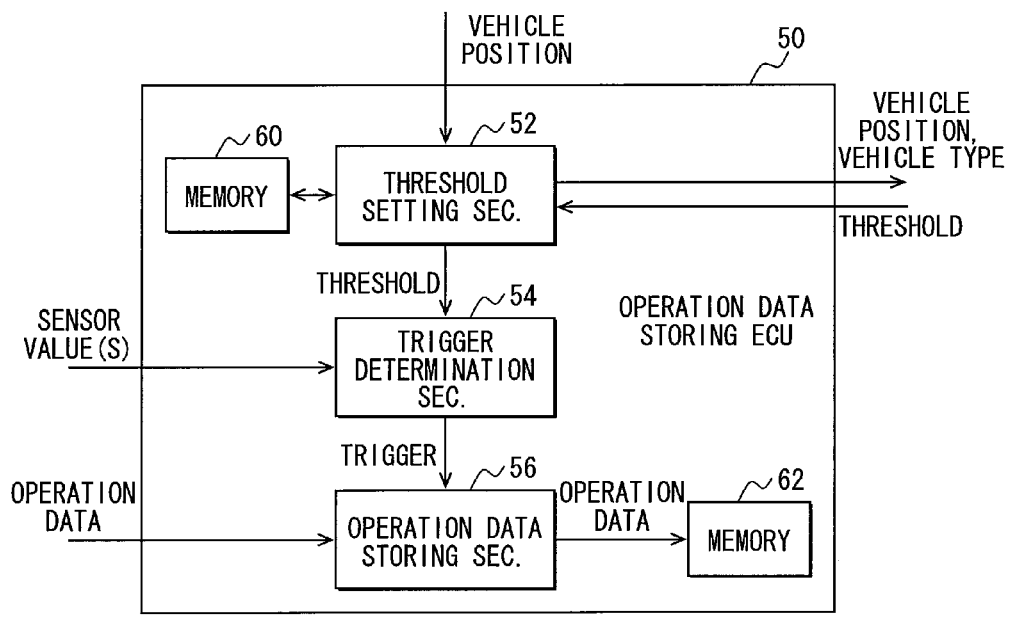
FIG. 9B is a block diagram illustrating the operation data storing electronic control unit according to the fourth embodiment.

Referring to FIGS. 9A and 9B, in an operation data storing system 16 according to a fourth embodiment, the operation data storing ECU 50 transmits the type of the vehicle, the VIN, and the vehicle position acquired from the navigation ECU 40 to the remote base station 80 through the communication device 70. Further, the operation data storing ECU 50 receives the threshold that is set in the remote base station 80 based on the vehicle position and the type of the vehicle through the communication device 70.

Next, an operation data storing process performed by the operation data storing ECU 50 and a threshold setting process performed by the remote base station 80 will be described with reference to FIGS. 10A and 10B. The process from S506 to S510 of FIG. 10A is substantially the same as the process from S478 to S482 of FIG. 8A, and a description thereof will not be repeated.

(Operation Data Storing Process)

Figure 10A:
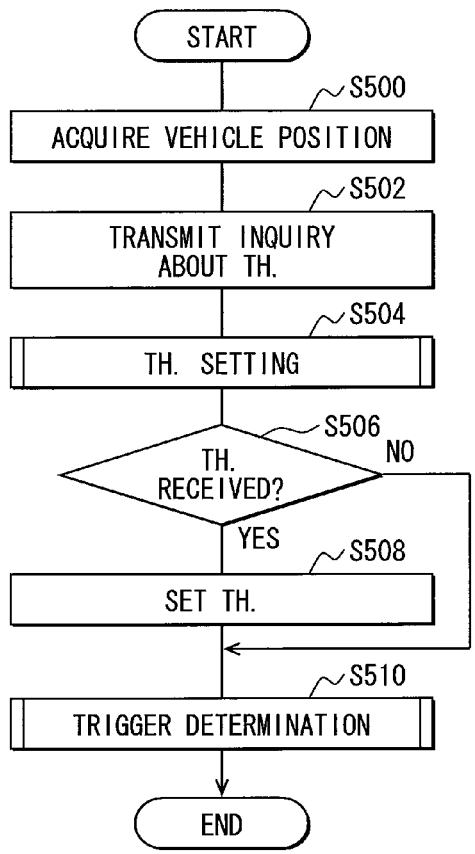
FIG. 10A is a flowchart illustrating a main process of an operation data storing process according to the fourth embodiment.

FIG. 10A is a flowchart illustrating a main process of the operation data storing process. For example, the main process is performed every 100 ms.

At S500, the operation data storing ECU 50 acquires the position of the subject vehicle from the navigation ECU 40. At S502, the operation data storing ECU 50 transmits the vehicle position, the type of the vehicle and the VIN to the remote base station 80 through the communication device 70 to inquire the threshold of the determination condition corresponding to the vehicle position and the type of the vehicle.

A process at S504 corresponds to the threshold setting process performed by the remote base station 80 in response to the inquiry of the threshold from the vehicle. The process at S504 will be described hereinafter in detail.

(Threshold Setting Process)

Figure 10B:
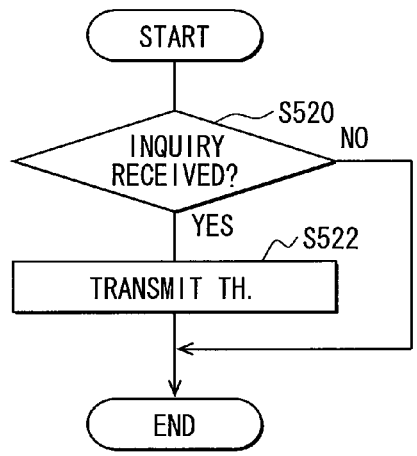
FIG. 10B is a flowchart illustrating a threshold setting process according to the fourth embodiment.

FIG. 10B is a flowchart illustrating the threshold setting process performed by the remote base station 80.

When the remote base station 80 receives the inquiry of the threshold corresponding to the vehicle position and the type of the vehicle from the vehicle, corresponding to "Yes" at S520, the remote base station 80 determines the road condition on which the vehicle is traveling based on the vehicle position received from the vehicle and the map data base, and acquires the threshold corresponding to the road condition and the type of the vehicle from the threshold data base, at S522. Further, the remote base station 80 transmits the threshold acquired to the vehicle.

In the fourth embodiment, the vehicle position and the type of the vehicle are transmitted to the remote base station 80. In the remote base station 80, the road condition is acquired based on the vehicle position. Therefore, even if it is difficult to acquire a suitable road condition from the navigation ECU 40 because the map data to which the navigation ECU 40 refers to is not new and accuracy of the road condition determined in the navigation ECU 40 is low, a suitable road condition can be acquired in the remote base station 80.

Even if the navigation ECU 40 does not have a function of outputting the road condition, a suitable road condition can be acquired in the remote base station 80 based on the vehicle position transmitted to the remote base station 80 from the subject vehicle.

In the fourth embodiment, the operation data storing ECU 50 transmits the road condition and the type of the vehicle to the remote base station 80, and acquires the threshold corresponding to the road condition and the type of the vehicle from the remote base station 80. Therefore, the operation data storing ECU 50 can acquire the threshold that is in a different range from the threshold acquired in the subject vehicle.

For example, in a case where the operation data of the vehicle behavior that satisfies a determination condition different from an ordinary determination condition is expected to be stored for a predetermined period of time from the time the corresponding type of vehicles are put on market, or in a case where the operation data when a specific abnormal behavior occurs is expected to be stored because unexpected abnormal behaviors occur and user's complaints are frequently made, the operation data storing ECU 50 can acquire the threshold set in accordance with these conditions from the remote base station 80.

In such a case, the operation data storing ECU 50 can acquire the threshold set in accordance with these conditions even when the vehicle is not brought to a dealer or the like.

In the fourth embodiment, the process of acquiring the vehicle position from the navigation ECU 40, transmitting the vehicle position to the remote base station 80, receiving the threshold from the remote base station 80, and setting the threshold received from the remote base station 80 as the threshold, at S500, S502, S506 and S508 of FIG. 10, corresponds to a function provided by the threshold acquiring element. The process of comparing the vehicle behavior to the determination condition at S510 corresponds to a function provided by the behavior determining element. The process of storing the operation data in the memory 62 at S510 corresponds to a function provided by the storing element.

Fifth Embodiment

A structure of an operation data storing system according to the fifth embodiment is substantially the same as a structure of the operation data storing system 10 of the first embodiment. Hereinafter, processes different from the process of the first embodiment will be mainly described.

(Operation Data Storing Process)

An operation data storing process performed by the operation data storing ECU 50 will be described with reference to FIGS. 11 through 14.

Figure 11:
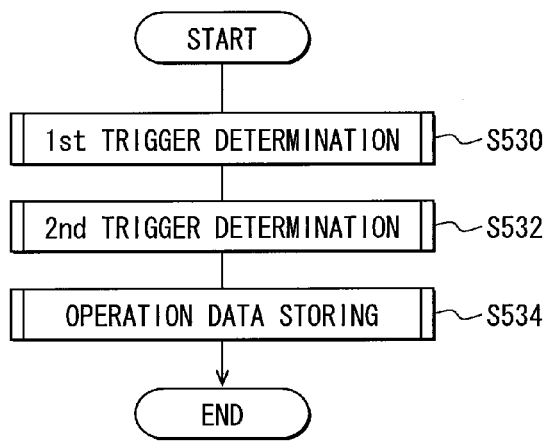
FIG. 11 is a flowchart illustrating a main process of an operation data storing process according to a fifth embodiment of the present disclosure.

FIG. 11 is a flowchart illustrating a main process of the operation data storing process. For example, the main process is performed every 100 ms. The main process of FIG. 11 includes a first trigger determination process of S530, a second trigger determination process of S532, and an operation data storing process of S534.

Figure 12A:
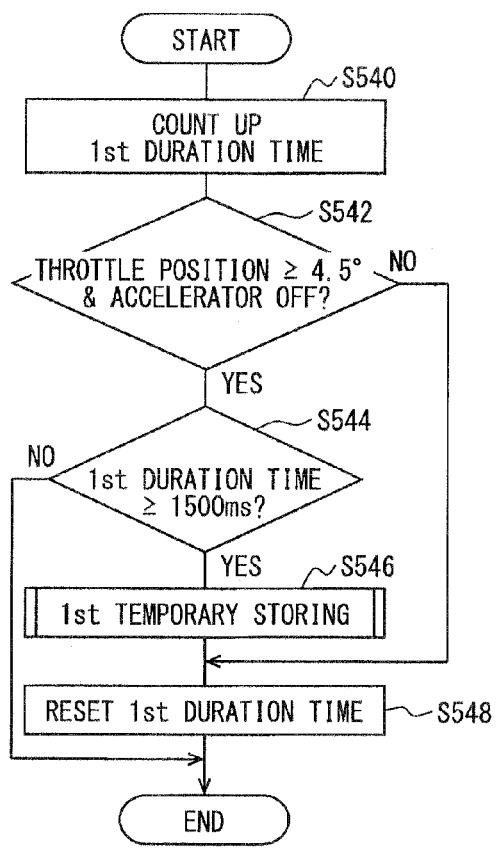
FIG. 12A is a flowchart illustrating a first trigger determination process according to the fifth embodiment.
Figure 12B:
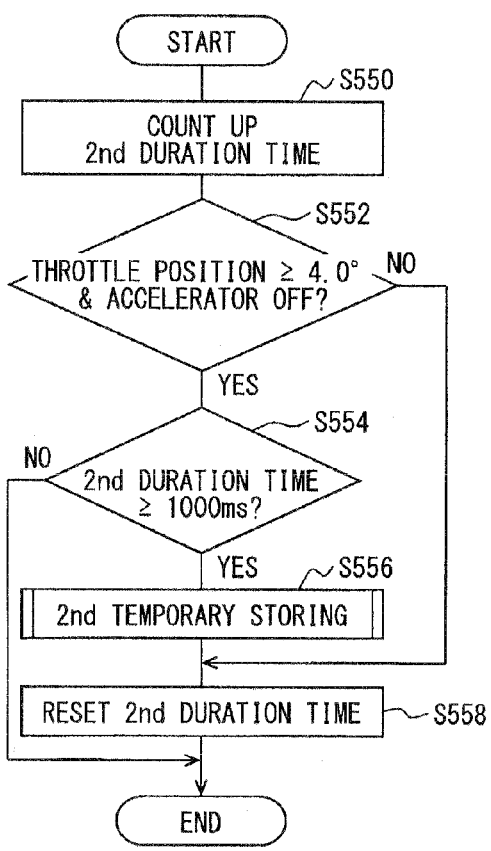
FIG. 12B is a flowchart illustrating a second trigger determination process according to the fifth embodiment.

FIG. 12A is a flowchart illustrating the first trigger determination process, and FIG. 12B is a flowchart illustrating the second trigger determination process. In the first trigger determination process and the second trigger determination process, the throttle position threshold and the duration time threshold, which define the determination condition for determining the vehicle behavior, are different.

(First Trigger Determination Process)

Referring to FIG. 12A, at S540, the operation data storing ECU 50 counts up a first duration time. At S542, the operation data storing ECU 50 determines whether the throttle position is equal to or greater than 4.5° and the accelerator is off. When the throttle position is equal to or greater than 4.5° and the accelerator is off, corresponding to "Yes" at S542, the operation data storing ECU 50 proceeds to S544. When the throttle position is less than 4.5° or the accelerator is on, corresponding to "No" at S542, the operation data storing ECU 50 proceeds to S548.

At S544, the operation data storing ECU 50 determines whether the first duration time is equal to or greater than 1500 ms. When the first duration time is less than 1500 ms, corresponding to "No" at S544, the operation data storing ECU 50 ends the first trigger determination process. When the first duration time is equal to or greater than 1500 ms, corresponding to "Yes" at S544, the operation data storing ECU 50 performs a first temporary storing process at S546, and then proceeds to S548. In the first temporary process of S546, the operation data is temporarily stored as well as the time the operation data is stored is temporarily stored. At S548, the operation data storing ECU 50 resets the first duration time.

As described above, in the first trigger determination process, it is provisionally determined whether the throttle position is equal to or greater than 4.5° and the accelerator is off, and whether the first duration time is equal to or greater than 1500 ms.

(Second Trigger Determination Process)

Referring to FIG. 12B, at S550, the operation data storing ECU 50 counts up a second duration time. At S552, the operation data storing ECU 50 determines whether the throttle position is equal to or greater than 4.0° and the accelerator is off. When the throttle position is equal to or greater than 4.0° and the accelerator is off, corresponding to "Yes" at S552, the operation data storing ECU 50 proceeds to S554. When the throttle position is less than 4.0° or the accelerator is on, corresponding to "No" at S552, the operation data storing ECU 50 proceeds to S558.

At S554, the operation data storing ECU 50 determines whether the second duration time is equal to or greater than 1000 ms. When the second duration time is less than 1000 ms, corresponding to "No" at S554, the operation data storing ECU 50 ends the second trigger determination process. When the second duration time is equal to or greater than 1000 ms, corresponding to "Yes" at S554, the operation data storing ECU 50 performs a second temporary storing process at S556, and then proceeds to S558. In the second temporary storing process of S556, the operation data is temporarily stored as well as the time the operation data is stored is temporarily stored. At S558, the operation data storing ECU 50 resets the second duration time.

As described above, in the second trigger determination process, it is provisionally determined whether the throttle position is equal to or greater than 4.0° and the accelerator is off, and whether the second duration time is equal to or greater than 1000 ms.

In the first trigger determination process, the throttle position threshold and the duration time threshold for defining the determination condition are 4.5° and 1500 ms, respectively. In the second trigger determination process, the throttle position threshold and the duration time threshold for defining the determination condition are 4.0° and 1000 ms, respectively. Therefore, the vehicle behavior more readily satisfies the determination condition in the second trigger determination process than in the first trigger determination process. In other words, the threshold of the second trigger determination process is set to define the determination condition at a lower condition than that of the first trigger determination process.

For example, the second trigger determination process may be used for determining whether the vehicle behavior satisfies the determination condition when the road condition is a curved road, and the first trigger determination process may be used for determining whether the vehicle behavior satisfies the determination condition when the road condition is a straight road where the vehicle behavior does not easily satisfy the determination condition than the curved road.

In the first and second trigger determination processes, it is determined beforehand whether the vehicle behavior satisfies the determination conditions having different thresholds, irrespective of the road condition. When the vehicle behavior satisfies at least one of the determination conditions, the operation data satisfying the determination condition is temporarily stored, and the time the operation data is stored is temporarily stored.

The region of storing the operation data and the time the operation data is stored are different between the first temporary storing process and the second temporary storing process. Therefore, even if the vehicle behavior satisfies multiple determination conditions having different thresholds, the operation data for each of the multiple determination conditions can be stored.

Next, the first temporary storing process performed at S546 of FIG. 12A will be described in detail with reference to FIG. 13A, and the second temporary storing process performed at S556 of FIG. 13B will be described in detail with reference to FIG. 13B.

(First Temporary Storing Process)

Figure 13A:
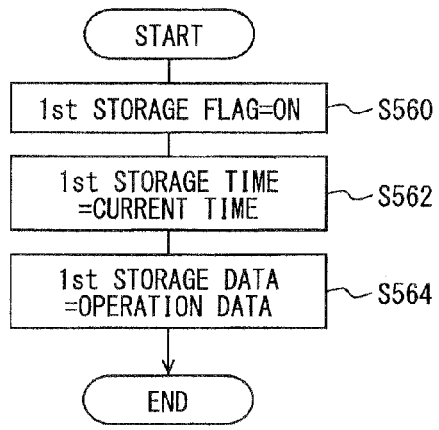
FIG. 13A is a flowchart illustrating a first temporary storing process according to the first embodiment.

Referring to FIG. 13A, at S560, the operation data storing ECU 50 turns on a first storage flag. At S562, the operation data storing ECU 50 temporarily stores a current time as a first storage time where the operation data is temporarily stored in the RAM of the memory 60. At S564, the operation data storing ECU 50 temporarily stores the operation data when the vehicle behavior satisfies the determination condition in the first trigger determination process as a first storage data in the RAM of the memory 60.

(Second Temporary Storing Process)

Figure 13B:
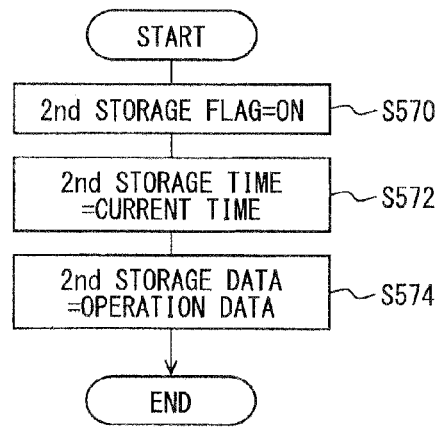
FIG. 13B is a flowchart illustrating a second temporary storing process according to the fifth embodiment.

Referring to FIG. 13B, at S570, the operation data storing ECU 50 turns on a second storage flag. At S572, the operation data storing ECU 50 temporarily stores a current time as a second storage time where the operation data is temporarily stored in the RAM of the memory 60. At S574, the operation data storing ECU 50 temporarily stores the operation data when the vehicle behavior satisfies the determination condition in the second trigger determination process as a second storage data in the RAM of the memory 60.

As described above, the operation data and the current time where the operation data is stored are stored in different regions between the first temporary storing process and the second temporary storing process in the memory 62.

(Operation Data Storing Process)

Figure 14:
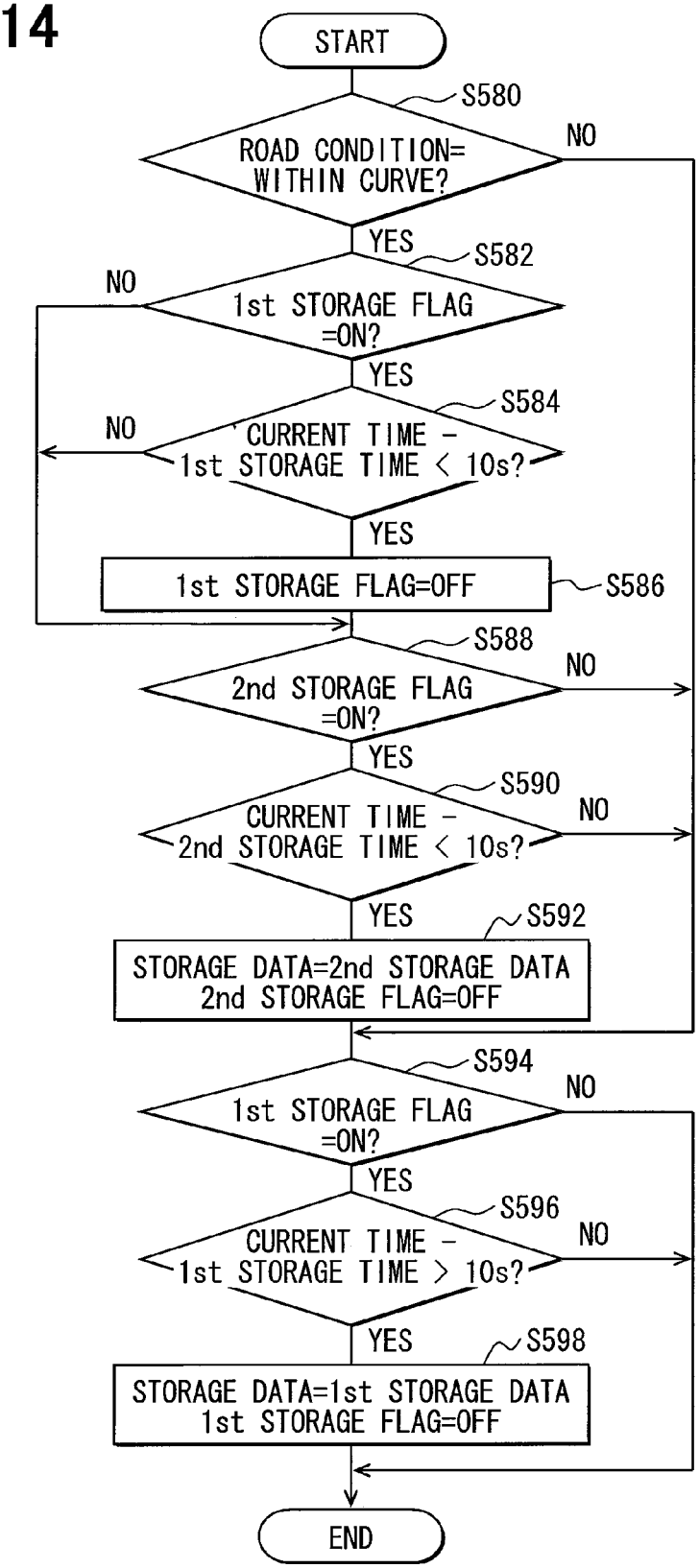
FIG. 14 is a flowchart illustrating the operation data storing process according to the fifth embodiment.

FIG. 14 is a flowchart illustrating the operation data storing process performed at S534 of FIG. 11.

In the operation data storing process of FIG. 14, irrespective of the road condition, when the vehicle behavior satisfies at least one of the determination conditions having different thresholds, of the operation data temporarily stored by the first and second temporary storing processes, the operation data corresponding to an actual condition of the road on which the vehicle actually travels is temporarily stored in the memory 60 is formally stored.

At S580, the operation data storing ECU 50 determines whether the road condition indicates a condition within a curve. When the road condition indicates the condition within a curve, corresponding to "Yes" at S580, the operation data storing ECU 50 proceeds to S582. When the road condition does not indicate the condition within the curve, corresponding to "No" at S580, the operation data storing ECU 50 proceeds to S594 without performing a process from S582 to S592.

At S582, the operation data storing ECU 50 determines whether the first storage flag is on, that is, whether the operation data is stored by the first temporary storing process as the vehicle behavior satisfies the determination condition corresponding to the straight road.

When the first storage flag is on, corresponding to "Yes" at S582, the operation data storing ECU 50 determines whether an elapsed time from the first storage time stored by the first temporary storing process to a current time where the road condition is within the curve is less than 10 s at S584.

When the first storage flag is on, corresponding to "Yes" at S582, and the elapsed time from the first storage time to the current time is less than 10 s, corresponding to "Yes" at S584, the operation data storing ECU 50 determines that the operation data is stored at the first storage time, which is less than 10 s before the vehicle enters the curve as the 10 s has not elapsed from the time the operation data is stored in the first storing process.

At the first storage time, which is less than 10 s before the vehicle enters the curve, it is assumed that the road condition is before or within the curve and hence the deceleration operation is performed. In such a case, at S586, the operation data storing ECU 50 determines that the operation data stored in the first storing process, in which the road condition is set for the straight road, is improper, and turns off the first storage flag. Then, the operation data storing ECU 50 proceeds to S588.

In this way, even if the first storage flag is on in the first storing process less than 10 s before the vehicle enters the curve, the first storage flag is turned off at S586 before 10 s elapses from the first storage time. As a result, a determination result of S584 is not made "No" when it is less than 10 s before vehicle enters the curve and the first storage flag is on in the first storing process.

When the first storage flag is off, the operation data stored in the memory 60 by the first temporary storing process is not formally stored in the memory 62.

When the first storage flag is off, corresponding to "No" at S582, the operation data is not stored by the first temporary storing process. Therefore, the operation data storing ECU 50 proceeds to S588 without turning off the first storage flag.

When the first storage flag is on, corresponding to "Yes" at S582, the operation data storing ECU 50 determines whether the elapsed time from the first storage time to the current time where the road condition is within the curve is less than 10 s at S584. When the elapsed time is equal to or greater than 10 s, corresponding to "No" at S584, the operation data storing ECU 50 determines that the road condition when the operation data is stored in the first temporary storing process, which is set for the straight road, is not before the curve but is a straight road, as 10 s or more has elapsed from the time the operation data is stored in the first temporary storing process to the time the vehicle enters the curve.

In this case, the operation data stored in the first temporary storing process corresponds to the road condition. Therefore, the operation data storing ECU 50 proceeds to S588 without turning off the first storage flag.

At S588, the operation data storing ECU 50 determines whether the second storage flag is on. Namely, the operation data storing ECU 50 determines whether the operation data is stored in the second temporary process as the vehicle behavior satisfies the determination condition corresponding to the road condition of the curve.

When the second storage flag is on, corresponding to "Yes" at S588, the operation data storing ECU 50 determines whether an elapsed time from the time the operation data is stored in the second temporary process to the current time where the road condition is within a curve is less than 10 s at S590.

When the elapsed time from the second storage time to the current time where the road condition is within the curve is less than 10 s, corresponding to "Yes" at S590, the operation data storing ECU 50 determines that the operation data is stored in the second temporary storing process at the second storage time that is less than 10 s before the vehicle enters the curve, as 10 s or more has not elapsed from the time the operation data is stored in the second temporary storing process to the current time where the vehicle is within the curve.

At the second storage time that is less than 10 s before the vehicle enters the curve, it is assumed that the road condition is before or within the curve and the deceleration operation is performed. In this case, the operation data storing ECU 50 determines that the operation data stored in the second temporary storing process, which is set for the curve as the road condition, is proper. Thus, the operation data storing ECU 50 formally stores the second storage data, which has been temporarily stored in the memory 60, in the memory 62 as the operation data, and turns off the second storage flag at S592. Then, the operation data storing ECU 50 proceeds to S594.

When the second storage flag is off, corresponding to "No" at S588, the operation data storing ECU 50 determines that the operation data is not stored in the second temporary storing process, and proceeds to S594.

When the second storage flag is on, corresponding to "Yes" at S588, the operation data storing ECU 50 determines whether the elapsed time from the second storage time to the current time where the road condition is within the curve is less than 10 s at S590. When the elapsed time is equal to or greater than 10 s, corresponding to "No" at S590, the operation data storing ECU 50 determines that the road condition when the operation data is stored in the second temporary storing process, which is set for the curve as the road condition, is not before the curve but the straight road, as 10 s or more has elapsed from the time the operation data is stored in the second temporarily storing process to the time the vehicle enters the curve.

In this case, the operation data storing ECU 50 does not store the operation data, which has been stored in the memory 60 in the second temporary storing process, in the memory 62, but proceeds to S594. When the determination result of S590 is "No" even if the second storage flag is on, the process of S592 is not performed. Therefore, the second storage flag is not turned off.

At S594, the operation data storing ECU 50 determines whether the first storage flag is on. When the first storage flag is on, corresponding to "Yes" at S594, the operation data storing ECU 50 determines whether an elapsed time from the first storage time where the operation data is stored in the first temporary storing process to the current time is equal to or greater than 10 s at S596. When the elapsed time is equal to or greater than 10 s, corresponding to "Yes" at S596, the operation data storing ECU 50 determines that the road condition when the operation data is stored in the first temporarily storing process, which is set for the straight road as the road condition, is not before the curve, but a straight road, as 10 s or more has elapsed from the time the operation data is stored in the first temporary storing process to the time the vehicle enters the curve.

Therefore, the operation data storing ECU 50 determines that the first storage data temporarily stored in the memory 60 is proper, and formally stores the first storage data as the operation data in the memory 62, and turns off the first storage flag at S598. Then, the operation data storing ECU 50 ends the operation data storing process.

When the first storage flag is on, corresponding to "Yes" at S594, and the elapsed time from the first storage time to the current time is less than 10 s, corresponding to "No" at S596, it can be determined that the current road condition is not within the curve but a straight road including a position before the curve, as the first storage flag should have been off at S586 if the current road condition is within the curve.

However, the elapsed time from the first storage time to the current time is less than 10 s, the operation data storing ECU 50 determines that the road condition is not decided as a position before the curve or a straight road. Thus, the operation data storing ECU 50 ends the operation data storing process.

When the first storage flag is off, corresponding to "No" at S594, the operation data has not been stored in the second temporary storing process. Therefore, the operation data storing ECU 50 ends the operation data storing process.

In the fifth embodiment described above, irrespective of the road condition, the operation data is temporarily stored when the vehicle behavior satisfies at least one of the determination conditions having different thresholds. Further, when the actual condition of the road on which the vehicle is traveling coincides with the road condition corresponding to the operation data temporarily stored, the operation data temporarily stored is formally stored as the operation data.

For example, even if the road diverges ahead, and diverged roads have different road conditions, such as one being a straight road and the other being a curve, when the vehicle behavior satisfies at least one of the determination conditions having different thresholds corresponding to conditions of the diverged roads, the operation data is temporarily stored. Therefore, even if the vehicle enters any one of the diverged roads, when the vehicle behavior satisfies the determination condition, a suitable operation data can be stored while selecting from the operation data temporarily stored.

In the fifth embodiment, a process of referring to the threshold when comparing the throttle position and the duration time to the thresholds at S542 and S544 of FIG. 12A and S552 and S554 of FIG. 12B corresponds to a function provided by the threshold acquiring element. A process of comparing the throttle position and the duration time to the thresholds at S542 and S544 of FIG. 12A and S552 and S554 of FIG. 12B corresponds to a function provided by the behavior determining element.

A process of temporarily storing the operation data at S564 of FIG. 13A and S574 of FIG. 13B corresponds to a function provided by a temporarily storing element. A process of acquiring the road condition for determining whether the road condition is within a curve at S580 of FIG. 14 corresponds to a function provided by the road condition acquiring section. A process of formally storing the first and second storage data at S592 and S598 of FIG. 14 corresponds to a function provided by the storing element.

Other Embodiments

In the embodiments described above, the throttle position threshold and the duration time threshold of the vehicle behavior are exemplarily described as the thresholds of the determination condition to be compared to the vehicle behavior. However, the thresholds of the determination conditions are not limited to the throttle position threshold and the duration time threshold. For example, a vehicle speed and the like may be used as the threshold of the determination condition.

In the fifth embodiment, as the road conditions to be compared to the determination conditions having different thresholds, the curve and the straight road, which has the greater threshold than the curve and is not easily determined when the vehicle is in an accelerating state, are exemplarily described. Further, a road condition that has a threshold of a determination condition different from those of the curve and the straight road may be compared to the determination condition, in addition to the curve and the straight road.

The storage unit for storing the operation data is not limited to the storage unit provided in the operation data storing ECU 50, but may be any other storage unit. The storage unit for formally storing the operation data is not limited to the SRAM or the EEPROM, but may be any other storage unit that can hold the data even if the vehicle operation is stopped.

The embodiments described above may be employed to any type of vehicle, such as a vehicle that is driven by an internal combustion engine such as a gasoline engine and a diesel engine, a hybrid vehicle having an internal combustion engine and a motor, and an electric vehicle driven by a motor.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. An electronic control unit for a vehicle, comprising:
a threshold acquiring element that acquires a plurality of thresholds for defining a plurality of determination conditions;
a behavior determining element that determines whether a vehicle behavior satisfies any of the plurality of the determination conditions defined by the thresholds;
a temporarily storing element that temporarily stores operation data of the vehicle when the vehicle behavior satisfying any of the plurality of the determination conditions in a corresponding one of a plurality of different regions of a storage unit, the plurality of different regions being correspondingly provided for the plurality of the determination conditions;
a road condition acquiring element that acquires an actual road condition on which the vehicle actually travels;
an operation data determining element that determines whether a road condition of each of the operation data temporarily stored corresponds to the actual road condition of when each of the operation data was temporarily stored; and
a formally storing element that formally stores the operation data the road condition of which is determined to correspond to the actual road condition by the operation data determining element.

2. The electronic control unit according to claim 1, wherein the road condition acquiring element acquires the road condition from a navigation device disposed in the vehicle.

3. The electronic control unit according to claim 2, wherein the threshold acquiring element transmits a type of the vehicle and the road condition acquired from the navigation device to a remote base station, and acquires the threshold corresponding to the road condition and the type of the vehicle from the remote base station.

4. The electronic control unit according to claim 1, wherein the road condition acquiring element receives a position of the vehicle from a position detecting device disposed in the vehicle, transmits the position of the vehicle to a remote base station, and acquires the road condition corresponding to the position of the vehicle from the remote base station.

5. The electronic control unit according to claim 1, wherein the threshold acquiring element calculates the threshold corresponding to the road condition.

6. The electronic control unit according to claim 1, wherein when the threshold acquiring element determines that a deceleration operation is indicated based on the road condition acquired by the road condition acquiring element, the threshold defines the determination condition as a lower condition to have an acceleration state as the vehicle behavior satisfying the determination condition earlier than when the determination condition is not lowered.

7. The electronic control unit according to claim 6, wherein the threshold acquiring element determines that the deceleration operation is indicated when the road condition acquired by the road condition acquiring element indicates a position before the curve.

8. The electronic control unit according to claim 6, wherein the threshold acquiring element determines that the deceleration operation is indicated when the road condition acquired by the road condition acquiring element indicates a downward slope.

9. The electronic control unit according to claim 6, wherein the threshold acquiring element determines that the deceleration operation is indicated when the road condition acquired by the road condition acquired element indicates a public parking.

10. The electronic control unit according to claim 1, wherein
when the threshold acquiring element determines that an acceleration operation is indicated based on the road condition acquired by the road condition acquiring element, the threshold defines the determination condition as a higher condition to have an acceleration state as the vehicle behavior satisfying the determination condition later than when the determination condition is not higher.

11. The electronic control unit according to claim 10, wherein
the threshold acquiring element determines that the acceleration operation is indicated when the road condition acquired by the road condition acquiring element indicates a rising slope.

12. The electronic control unit according to claim 1, wherein
when the threshold acquiring element determines that an acceleration state as the vehicle behavior unnecessarily satisfies the determination condition based on the road condition acquired by the road condition acquiring element, the threshold defines the determination condition to a higher condition to have the acceleration state satisfying the determination condition later than when the determination condition is not higher.

13. The electronic control unit according to claim 12, wherein
the threshold acquiring element determines that the acceleration state of the vehicle unnecessarily satisfies the determination condition when the road condition acquired by the road condition acquiring element indicates at least one of an unpaved road and a road under construction.

14. The electronic control unit according to claim 1, wherein
the threshold acquiring element acquires a position of the vehicle from a position detecting device disposed in the vehicle, transmits the position of the vehicle and a type of the vehicle to a remote base station, and acquires the road condition corresponding to the position of the vehicle and the threshold corresponding to the type of the vehicle from the remote base station.

15. An electronic control unit for a vehicle, comprising: a computer processor, the electronic control unit being at least configured to:
acquire a plurality of different thresholds for defining a plurality of different determination conditions;
determine whether a vehicle behavior satisfies any of the plurality of the determination conditions defined by the thresholds;
temporarily store operation data of the vehicle when the vehicle behavior satisfying any of the plurality of the determination conditions in a corresponding one of a plurality of different regions of a storage unit; the plurality of different regions being correspondingly provided for the plurality of the determination conditions;
acquire an actual road condition on which the vehicle actually travels;
determine whether a road condition of each of the operation data temporarily stored corresponds to the actual road condition of when each of the operation data was temporarily stored;
formally store the operation data the road condition of which is determined to correspond to the actual road condition.

16. An electronic control unit for a vehicle, comprising:
a threshold acquiring element that acquires a plurality of thresholds for defining a plurality of determination conditions;
a behavior determining element that determines whether a vehicle behavior satisfies any of the plurality of the determination conditions defined by the thresholds;
a temporarily storing element that temporarily stores operation data of the vehicle and a time the operation data being temporarily stored when the vehicle behavior satisfying any of the plurality of the determination conditions in a corresponding one of a plurality of different regions of a storage unit, the plurality of different regions being correspondingly provided for the plurality of the determination conditions;
a road condition acquiring element that acquires a current road condition on which the vehicle currently travels;
an actual road condition determining element that determines an actual road condition when each of the operation data was temporarily stored based on the current road condition and an elapsed time from the time each of the operation data being temporarily stored; and
a formally storing element that formally stores the operation data the road condition of which is determined to correspond to the actual road condition by the actual road condition determining element.

* * * * *